Feb. 15, 1966  F. G. BACK  3,234,849
PHOTOGRAPHIC PROJECTION DEVICE
Original Filed Jan. 16, 1962  5 Sheets-Sheet 1
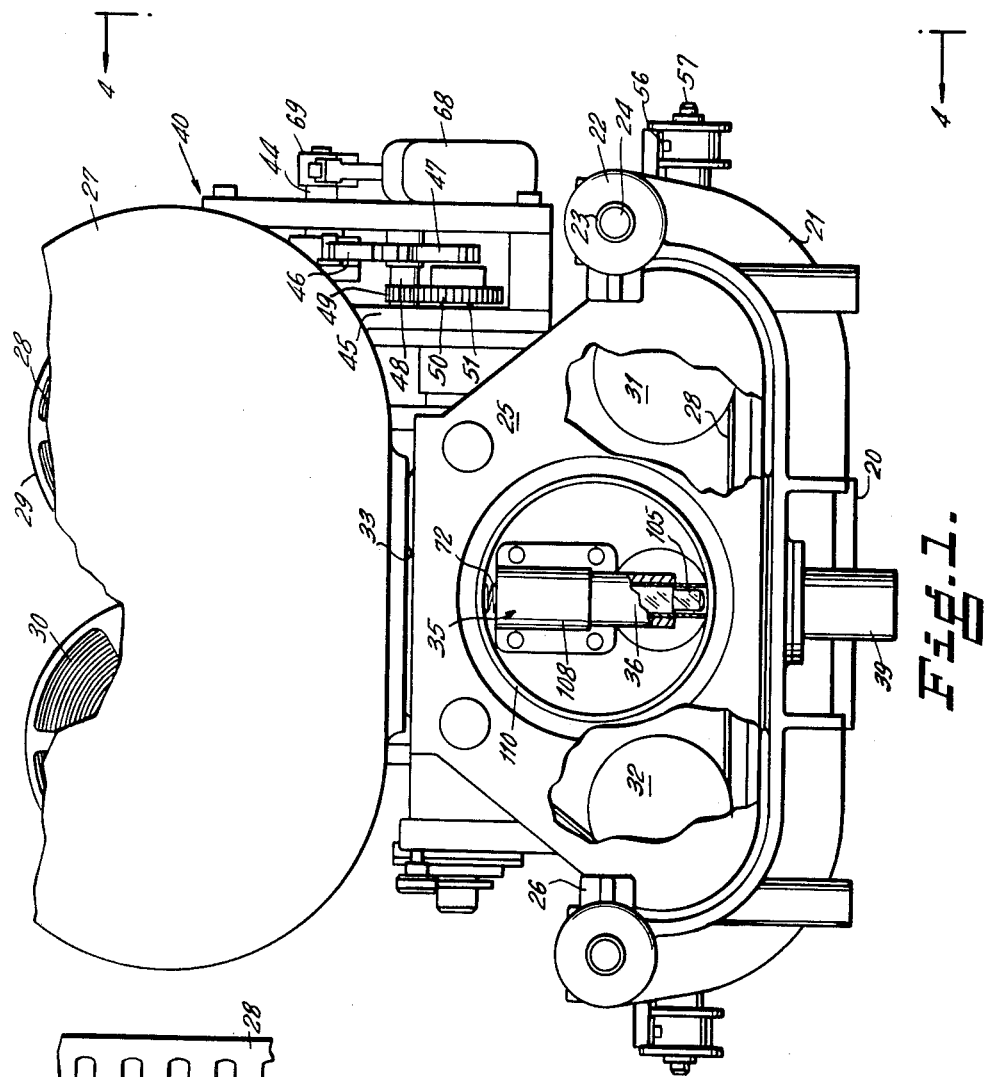
INVENTOR.
FRANK G. BACK
BY Albert H. Kronman
ATTORNEY

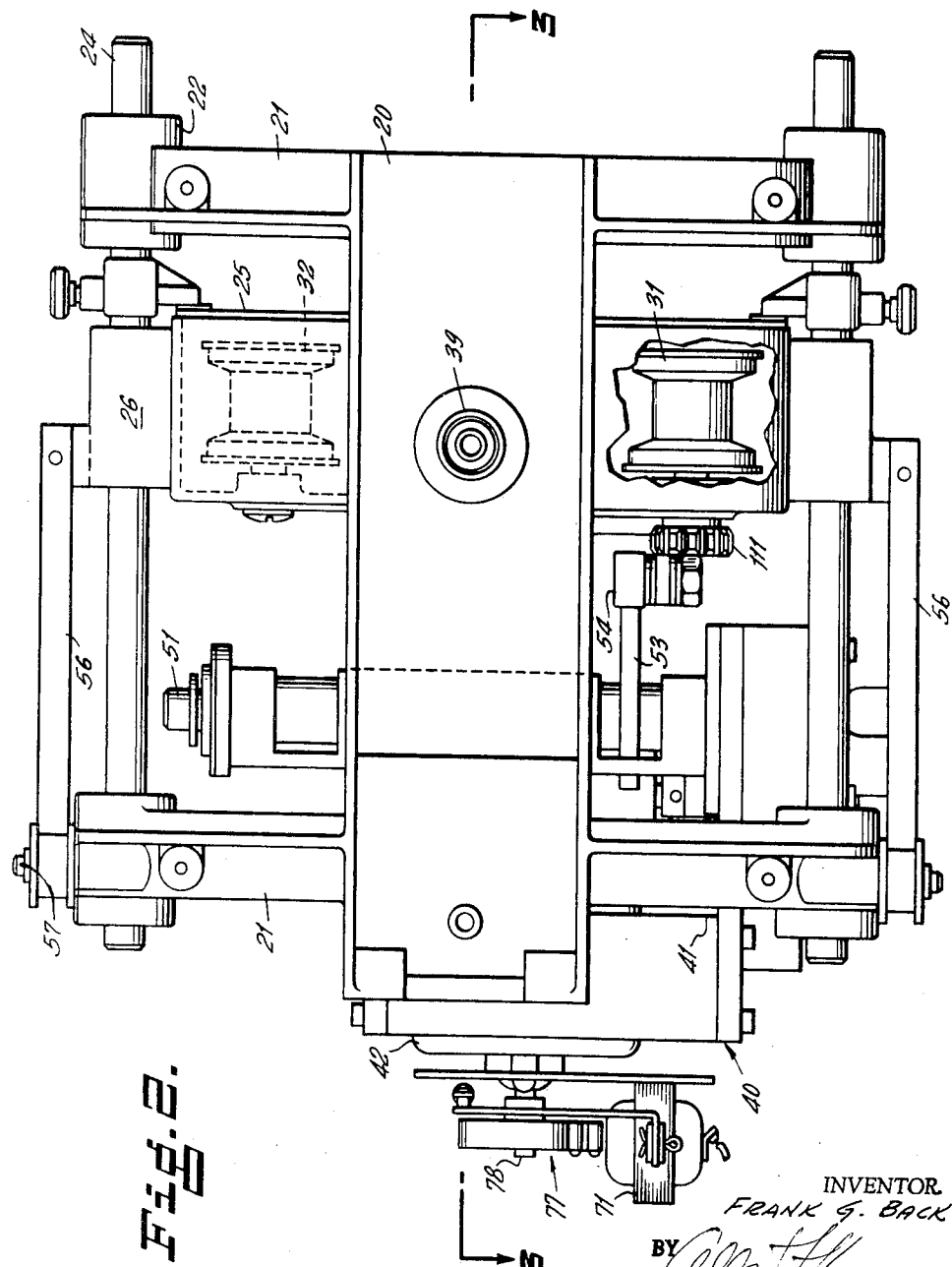

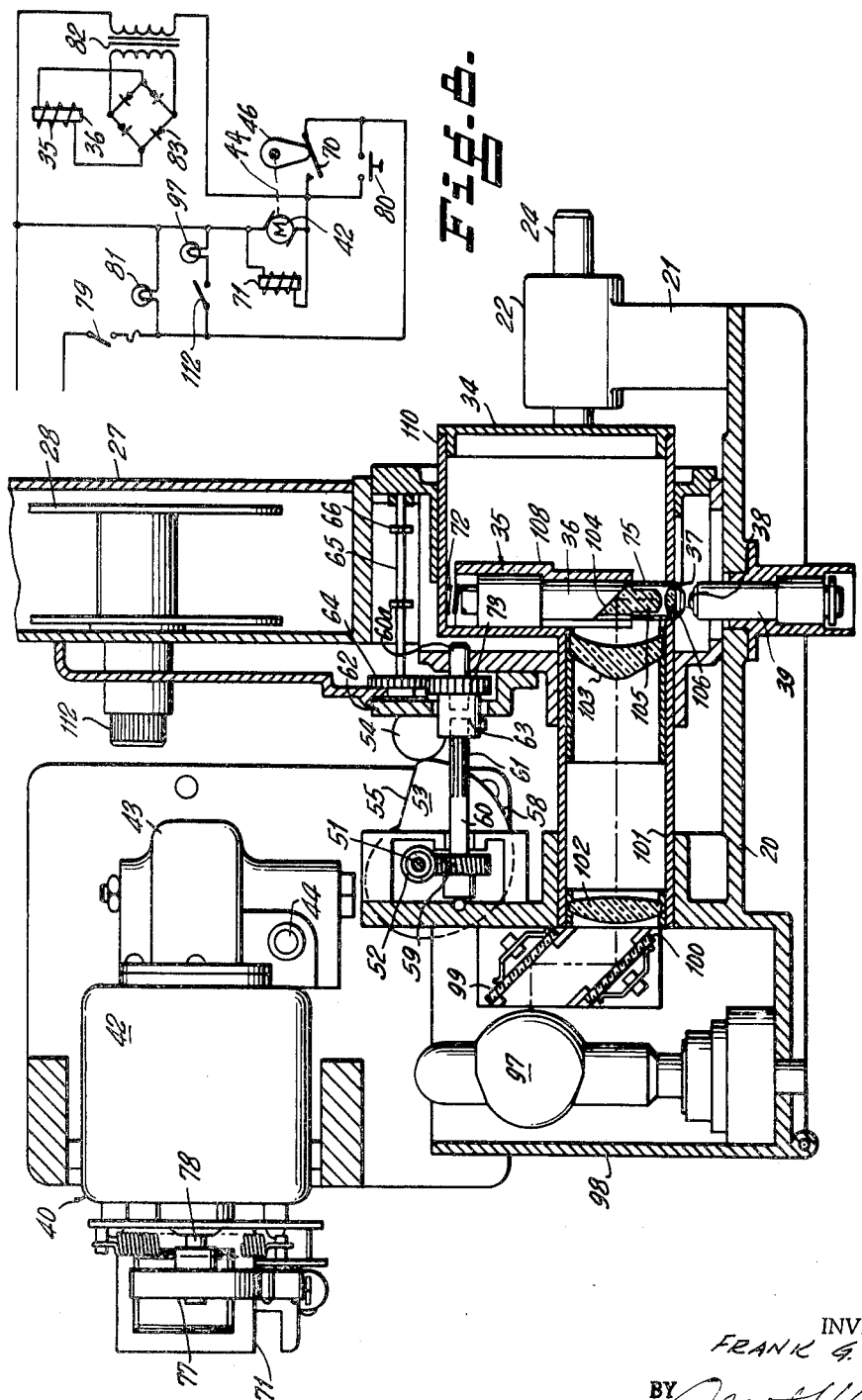

Feb. 15, 1966 F. G. BACK 3,234,849
PHOTOGRAPHIC PROJECTION DEVICE
Original Filed Jan. 16, 1962 5 Sheets-Sheet 4
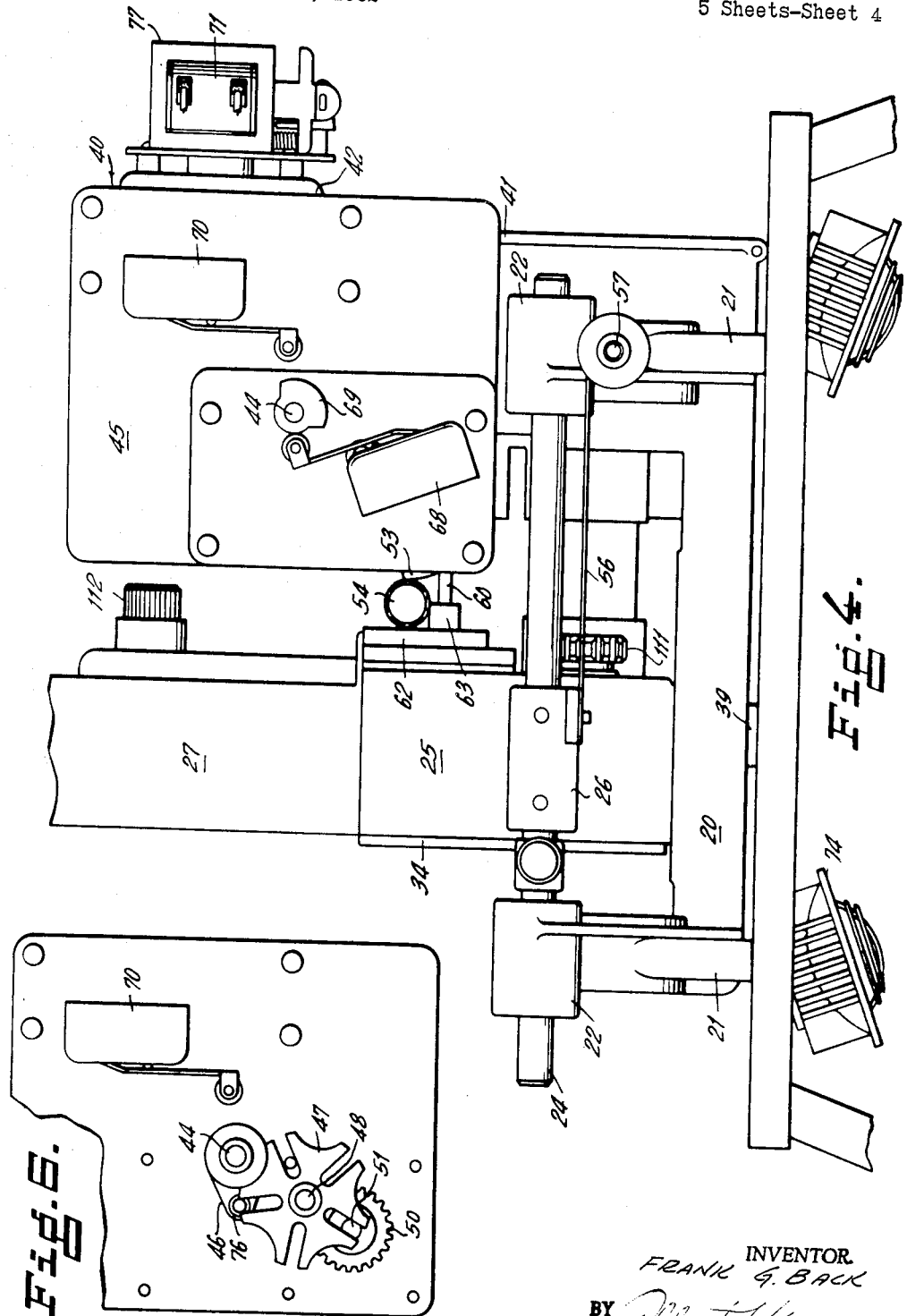
INVENTOR.
FRANK G. BACK
BY
ATTORNEY Feb. 15, 1966 F. G. BACK 3,234,849
PHOTOGRAPHIC PROJECTION DEVICE
Original Filed Jan. 16, 1962 5 Sheets-Sheet 5
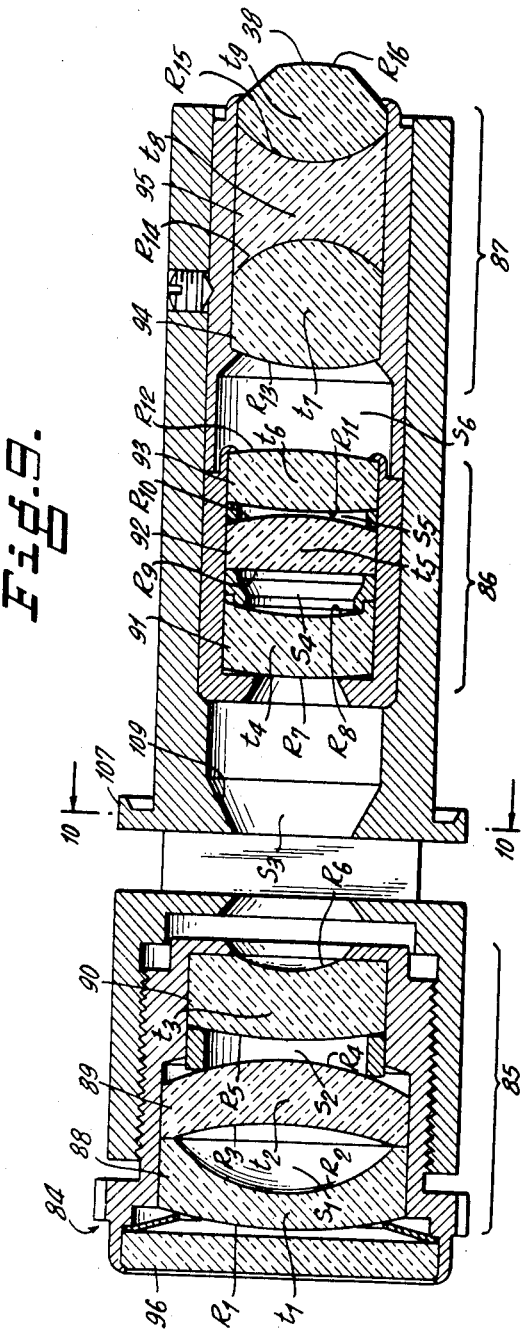
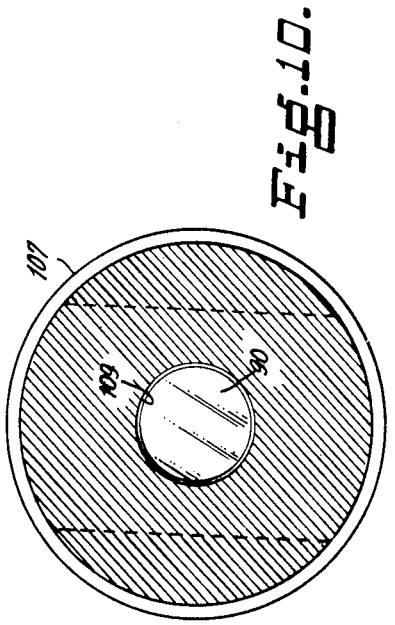
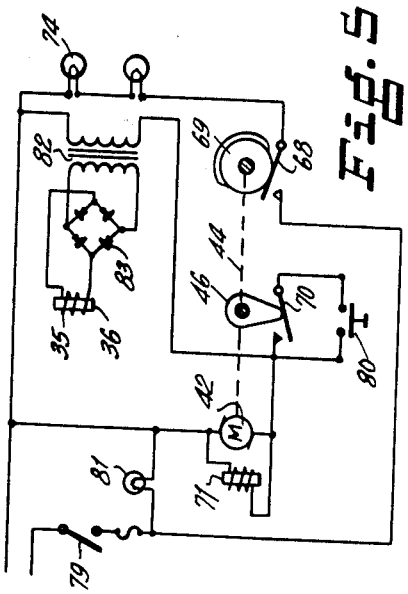
INVENTOR.
FRANK G. BACK
BY
ATTORNEY

United States Patent Office 3,234,849
Patented Feb. 15, 1966

3,234,849
PHOTOGRAPHIC PROJECTION DEVICE
Frank G. Back, 55 Sea Cliff Ave., Glen Cove, N.Y.
Original application Jan. 16, 1962, Ser. No. 166,492, now Patent No. 3,194,112, dated July 13, 1965. Divided and this application Apr. 13, 1965, Ser. No. 447,729
4 Claims. (Cl. 88—24)

This application is a division of an application for patent entitled Photographic Camera and Projection Device, filed January 16, 1962, Serial No. 166,492, now Patent No. 3,194,112, by Frank G. Back.

This invention relates to apparatus for rapidly and consecutively producing minute photographs of objects, such as books, records, blueprints and the like, of a quality which will permit the photographs to be enlarged to a size at least equal to the original with little loss of sharpness or detail.

It is well known to prepare photographic records of written material for the purpose of economy of storage and subsequent reproduction and reference. Such processes known as microfilming reduce the photographed subject to the size of a single frame of 35 mm. or 16 mm. film. By recording a series of frames on the same film strip it has been possible to roll the finished film and store it in a small space. Individual microfilm frames have been secured to supporting cards for retrieval and handling purposes.

It has also heretofore been known to produce extremely small photographs capable of being read only by a microscope and of being subsequently enlarged to readable size. However, presently known techniques for this purpose are time consuming, difficult and expensive.

Accordingly, it is an object of the present invention to produce a photographic record which will occupy only a minute portion of a film frame.

Another object of the present invention is to provide photographic apparatus capable of recording a vast amount of information upon a very small amount of film.

Still another object of the present invention is to provide a device for sequentially photographing papers, books and the like in the form of minute photographic dots for subsequent retrieval and projection.

An object of the present invention is to provide a photographic recording device which is substantially automatic in its operation.

A further object of the present invention is to provide a camera for taking minute photographs in a minimum amount of time.

Still another object of the present invention is to provide a device for taking and projecting minute photographs.

An object of the present invention is to provide a high resolution optical system having a wide angle of field.

A feature of the present invention is its use of an automatic film transport and indexing device for each exposure.

Another feature of the present invention is to provide a device for receiving and accurately positioning the film within the camera to insure uniform film exposure.

A feature of the present invention is its projection system for directing high intensity light through a film without damaging the film emulsion.

A further feature of the present invention is its use of a longitudinal and transverse indexing motion of the film after each exposure.

The invention consists of the construction, combination and arrangement of parts, as herein illustrated, described and claimed.

In the accompanying drawings, forming a part hereof is illustrated one form of embodiment of the invention, in which drawings similar reference characters designate corresponding parts, and in which:

FIGURE 1 is a view in front elevation partially broken away of a photographic recording device made in accordance with the present invention.

FIGURE 2 is a bottom plan view partially broken away of the device shown in FIGURE 1.

FIGURE 3 is a cross-sectional view taken on line 3—3 in FIGURE 2, looking in the direction of the arrows.

FIGURE 4 is a view in side elevation taken on line 4—4 in FIGURE 1 looking in the direction of the arrows.

FIGURE 5 is wiring diagram showing the manner in which the various photographic operations and indexing steps are controlled.

FIGURE 6 is a fragmentary view of the drive section shown in FIGURE 4 with certain parts removed to show the Geneva drive.

FIGURE 7 is a fragmentary view of a portion of the developed film taken in accordance with the present invention.

FIGURE 8 is a wiring diagram showing the connections for the photographic projection device according to the present invention.

FIGURE 9 is a vertical section on an enlarged scale showing the optical elements employed in conjunction with the present invention.

FIGURE 10 is a cross sectional view taken on line 10—10 in FIGURE 9.

Referring to the drawings and particularly to FIGURES 1 and 2, 20 indicates a rectangular base support member for a document photographing apparatus having upwardly curved lateral arms 21. The arms 21 extend from the front and rear of the base support and are preferably cast as an integral part thereof. Small bearing blocks 22 are carried upon the ends of each arm 21 and are centrally bored to receive a bushing 23 therein.

An elongated rod 24 is secured adjacent each end thereof on each side of the document photographing apparatus, within the bushings 23. The rod 24 is of sufficient thickness and rigidity to form a support and bearing surface for the camera as hereinafter more fully described.

A camera housing 25 is carried between the rods 24 by means of sleeve bearings 22–23 which are secured to arms 21 at each side of said housing 25. The sleeve bearings 22–23 slide upon the rods 24 as shown in FIGURE 2. The sleeve bearings 22–23 are of sufficient length to provide adequate bearing surface and prevent any vibration or skewing of the camera housing 25 as it moves forward and back on the rods 24.

Above the camera housing 25 there is secured a film magazine 27 which is light proof and within which there is a supply of film 28. The magazine 27 is provided with an opening 33 in the bottom thereof which is secured, in the well-known manner, to the camera housing 25 so that film can pass from the magazine into the camera housing without becoming light struck. The film 28 is led down from the magazine 27 into the camera housing 25 and then back into the magazine. A supply reel 29 and a takeup reel 30 are provided within the magazine to dispense and receive the film. Rollers 31, 32, are carried within the camera housing 25 to guide the film 28 through the camera housing.

A cover plate 34 shown in FIGURE 3 and removed for purposes of illustration in FIGURE 1 is provided on the front of a fixed barrel 110 along which the camera housing slides. The cover plate gives access to a solenoid 35 within the barred 110.

The film 28 passing between the guide rollers 31, 32, is carried beneath the solenoid armature assembly. The armature 36 of the solenoid 35, best shown in FIGURE 3, extends through an opening in the fixed barrel 110, and is provided at its lower end with a small ring-like platen 37. The platen 37 is formed with a carefully ground and polished bottom surface which fits over the lens mount of the last lens element 38 of the camera objective 39. The camera objective 39 is mounted in the base support 20 and extends downwardly. The importance of this construction will be hereinafter more fully set forth.

Power for the document photographing and projecting device is supplied by a drive section 40 located behind the camera 25 and secured to the base 20 at 41. A double shaft motor 42 or other source of rotary power is carried within the drive section 40. The motor 42 is coupled to a right angle drive box 43 from which there extends a lateral output shaft 44. The shaft 44 passes through a wall 45 in the drive section 40. A Geneva driver cam 46 is secured to the output shaft 44 and rotates with it. The driver cam 46 imparts a positive drive to the Geneva wheel 47 which is keyed to a shaft 48 journaled within the wall 45. A small gear 49 is secured to the shaft 48 and is in mesh with a driven gear 50. The driven gear 50 is secured to a shaft 51 which extends through the drive section 40. A worm gear 52 is secured to the opposite end of the shaft 51 as shown in FIGURE 3.

The shaft 51 also has keyed thereto a cam 53 which is disposed between the gear 50 and the worm gear 52. The cam 53 is provided with a peripheral cam face 58 which bears against a cam follower 54 secured to the back of the camera housing 25.

It will be observed from an examination of FIGURE 3 that as the cam 53 rotates the cam face 58 will slowly push the camera housing 25 forward along with the rods 24. The cam 53 is rotated through an angle of 24° for each exposure and is stopped at the end of each rotation by brake 77 which engages the outer end of the motor shaft 78. When cam follower 54 reaches the step 55 in the cam 53 the entire camera housing will snap back in the direction of the drive section, which action is accelerated by the ribbon-like flat spring members 56 which are disposed along the sides of the document photographing device. The flat spring members 56, best shown in FIGURES 2 and 4, are secured at one end to the rod engaging block 26 and at their opposite ends to shaft bearings 22, which are attached to one of the rear arms 21 on each side of the device. The flat springs 56 are loaded so that they are normally in their retracted position. Accordingly, when the pressure of the cam face 58 is released the spring members 56 are pulled back onto shaft 57 drawing the camera housing 25 along with the spaced rods 24.

The worm gear 52 drives a gear 59, carried upon the end of a small shaft 60 which is disposed normal to the worm gear shaft 51. The shaft 60 is longitudinally splined as shown at 61 and is received within a small slidable internally splined sleeve 63. The sleeve 63 can be slipped over a splined stub shaft 60a for driving engagement of a gear 73 which is secured thereto. The stub shaft 60a extends through a bracket 62 on the back of the camera housing 25. The gear 73 is in mesh with a small driven gear 64 which turns a shaft 65 to which it is secured. The shaft 65 is provided with spaced sprocket wheels 66 which serve to transport the film 28 through the photographic device.

It will be apparent from the foregoing that as the motor 42 drives the mechanism within the drive section 40, the camera housing 25 will be moved up and down along with the elongated rods 24 and at the same time the film 28 will be fed through the photographic device.

The result of this coordinated motion is best illustrated in FIGURE 7 where a small section of the film 28 is shown. It will be seen that a plurality of small areas defined by the squares 67 and representing individual exposures have been successively placed between the camera objective 39 and the platen 37 of the photographic device. These squares 67 are offset with respect to each other in accordance with the pattern shown in FIGURE 7 by reason of the successive movements of the camera housing 25 and the film 28. Thus, at the end of each exposure the camera housing is moved forward a slight amount and the film is advanced a slight amount to present an area for exposure which is slightly offset both transversely and longitudinally to the preceding exposed area. When the camera housing 25 reaches the end of its longitudinal travel by the cam face 58 reaching the portion of its cycle where the stepped part 55 allows the follower 54 to slide back in the direction of the shaft 51, a new line of squares 67 will be begun and successive exposures will be made substantially parallel to the preceding line of exposures. The illustration of FIGURE 7 is approximately twice actual size and will give a clear idea of the number of exposures which can be made upon the film as it moves through the photographic device.

In FIGURE 5 there is shown the manner in which the various electrical components are arranged to provide the sequence of steps necessary to operate the camera. When the main switch 79 and push button starting switch 80 are closed, current will flow to the motor 42 and the platen and brake solenoids 35, 71. The armature 36 will be lifted against spring 72, freeing the film 28. The output shaft 44, indicated by the dashed lines in FIGURE 5, will rotate and turn the Geneva driver 46 and the cam 69. As the Geneva driver 46 rotates it closes the micro-switch 70 (best shown in FIGURE 6). The micro-switch 70 energizes the brake solenoid 71 and keeps the brake open while the motor turns the shaft 44. The micro-switch 70 also passes current to the solenoid 35, after the starting switch 80 is released, to hold the platen 37 above lens 38 so that the film can pass therebetween. As the shaft 44 approaches the end of one revolution, the cam 46 opens the micro-switch 70 braking the motor and allowing the solenoid spring 72 to move the platen 37 against the film 28 and bring it to bear upon the last element 38 of the camera objective 39. The cam 69 at the same time closes the micro-switch 68 which operates the high intensity illuminants 74 to expose the film. A small on-off light 81 is shown in the wiring diagram to indicate the camera is in operation and ready for cycling. A transformer 82 and a rectifier 83 in the circuit of the platen solenoid 35 are also shown.

It will be understood that if a negative of minute size is to be produced which will be suitable for the intended purpose of the present invention, any irregularities of the film surface and any inclusion of air, dust, etc., or any deviation of the photosensitive surface from the optimum position within the camera over its entire field would be fatal to the satisfactory operation of the device. In order to overcome the possibility of improper placement of the film within the camera at the moment of exposure the film positioning structure shown in FIGURES 1 and 3, and hereinabove described, is provided. These members include the solenoid 35, the solenoid 38 of the camera objective 39 also cooperates with the platen 37 to correctly position and hold the film 28 during exposure.

After the film 28 is brought into the proper position for exposure by means of the indexing and advancing apparatus hereinabove described, the solenoid 35 is deactivated by means of the micro-switch 68, best shown in FIGURE 4. As the solenoid 35 is deactivated the armature 36 moves toward the objective 39 until the film 28 is sandwiched between the ring-like surface of the platen 37 and the last element 38 of the objective 39. Because of the pressure of the two surfaces all air will be excluded from between the film and lens surfaces. The film 28 will then be at the precise location within the camera for optimum photographic results as the illuminants 74 expose the film. In addition, the film will be held in place and cannot buckle or shift during the exposure.

Referring to FIGURES 9 and 10, there is shown the optical system of the camera which basically consists of an inverted telephoto system 84 made up of three triplet lens systems 85, 86, and 87. The first triplet 85 is movable for focusing. The system 84 is corrected for all monochromatic aberrations except for field curvature, and may be preceded by a color correcting filter 96.

The final image is formed on the last surface $R_{16}$ of the lens system 84, which surface has a curvature equal to the field curvature. Due to its high resolution and short focal length, the system has a very shallow depth of focus so that even a slight deviation from this ideal focal plane causes deterioration of the image quality. By pressing and holding the film against the last lens surface during exposure, no deviation from this ideal image plane can occur. Sharpness is thus achieved over the whole image plane, a result which is not possible if a conventional film gate were used, because even the most precise gate can not prevent the film from warping or buckling. It will be apparent that even the slightest deviation from the true image plane in a system such as is herein described, would cause a perceptible loss of resolution.

A further advantage of this arrangement becomes apparent when the system is used for reading and projecting purposes. Since the object, namely the image on the film, is not in air, as is customary, but in highly refractive glass (index of refraction more than 1.7) the numerical aperture of this system is increased (numerical aperture=refractive index times the sine of aperture angle). It is well known in the art that the greater the numerical aperture, the higher the resolution due to the decrease of the diameter of the central diffraction disk, the so-called Airy spurious disk.

The first triplet 85 of the system consists of three menisci 88, 89, 90, and has a total power with an absolute value of between .01 and .04 of the total power of the system, or written as an inequality:

$$0.01\Phi < |(\phi_{88} + \phi_{89} + \phi_{90})| < 0.04\Phi$$

the first and third of said menisci have negative power and are convex toward the incoming light. The second meniscus 89 has positive power and is concave towards the incoming light. Thus in all three of these elements 88, 89, 90, the dominant curvature is the second one counted in the direction of the light.

The absolute power of the first element 88 is more than .11 but less than .15 of the total power of the whole system and the ratio of its first radius $R_1$ to its second radius $R_2$ is more than 3 but less than 4, or written as an inequality:

$$0.11\Phi < \phi_{88}/ < 0.15\Phi$$

$$3 < \frac{R_1}{R_2} < 4$$

where $\Phi$ is the power of the total system and $\phi_{88}$ is the power of element 88. The second (positive) meniscus 89 has a power of more than .05 but less than .10 of the total power of the system and the ratio of its first radius $R_3$ to its second radius $R_4$ is more than 1 but less than 2, which means:

$$0.05\Phi < \phi_{89} < 0.10\Phi$$

$$1 < \frac{R_5}{R_5} < 2$$

The third (negative) meniscus 90 has an absolute power of more than .15 but less than .20 of the power of the whole system, with a ratio or radii of more than 3 but less than 5, or $$0.15\Phi < |\phi_{90}| < 0.2\Phi$$

$$3 < \frac{R_5}{R_6} < 5$$

This lens group 85 is followed by a second group 86 of three elements consisting of a negative meniscus 91 convex towards the incoming light and two biconvex positive elements 92, 93. The absolute power of the said negative meniscus 91 is more than .05 but less than .10 of the total power of the system, and the ratio of its front radius $R_7$ to its rear radius $R_8$ is more than 2 but less than 3, or $$0.05\Phi < |\phi_{91}| < 0.10\Phi$$

$$2 < \frac{R_7}{R_8} < 3$$

The first biconvex lens 92 has a power of more than .1 but less than .2 of the total power of the system with an absolute ratio of radii of more than 3 but less than 8, which means:

$$0.10\Phi < \phi_{92} < 0.20\Phi$$

$$3 < \left|\frac{R_9}{R_{10}}\right| < 8$$

The second positive biconvex element 93 has a power of more than .05 but less than .15 of the total power of the system and the absolute ratio of its first radius $R_{11}$ to its second radius $R_{12}$ is more than 2 but less than 5 or:

$$0.05\Phi < \phi_{93} < 0.15\Phi$$

$$2 < \left|\frac{R_{11}}{R_{12}}\right| < 5$$

The final lens group 87 forms a cemented positive triplet consisting of a biconvex element 94 and a biconvex last element 38. Enclosed between these two elements is an equi-concave negative element 95. The power of said triplet lies between .15 and .35 of the total power of the system. The absolute ratio of the front radius $R_{13}$ to the rear radius $R_{14}$ of the first biconvex lens is more than 1.5 but less than 2.0 while the absolute ratio of the front radius $R_{15}$ to the rear radius $R_{16}$ of the rear biconvex lens 38 is more than 1.0 but less than 2.5 or:

$$0.15\Phi < \phi_{87} < 0.35\Phi$$

$$1.5 < \left|\frac{R_{13}}{R_{14}}\right| < 2$$

$$1 < \left|\frac{R_{15}}{R_{16}}\right| < 2.5$$

Since both these elements 94, 38, are cemented to an equi-concave negative component 95 the last radius $R_{14}$ of the first positive component 94 and the first radius $R_{15}$ of the second positive component 38 are of course equal, while the second radius $R_{16}$ of the said second positive component 38 is equal to the radius of field curvature of the whole system for reasons explained above.

A fixed stop 109 is formed in the lens barrel 107 between the first and second lens groups 85, 86.

For the purpose of exemplification specific data for the lens elements employed in the present invention and shown in FIGURE 9 are set forth in the following table, it being understood that this data is given by way of illustration only and not as limiting scope of the present invention. The specific lens system shown in FIGURE 9 comprising one preferred embodiment of the present invention, consists of:

Table

| Lens No. | Radius (R) | Thickness (t) Air Spacing (s) | Glass Cat. Ref. | Index $N_d$ | Abbe's Dispersion No. (v) |
|---|---|---|---|---|---|
| 88 | $R_1=+21.330$ | $t_1=1.25$ | FK 5 | 1.487 | 70.041 |
|  | $R_2=+6.080$ | $s_1=2.84$ |  |  |  |
| 89 | $R_3=-16.290$ | $t_2=2.50$ | SF 4 | 1.755 | 27.512 |
|  | $R_4=-10.350$ | $s_2=0.81$ |  |  |  |
| 90 | $R_5=+17.680$ | $t_3=2.64$ | FK 5 | 1.487 | 70.041 |
|  | $R_6=+4.598$ | $s_3=11.35$ |  |  |  |
| 91 | $R_7=+31.870$ | $t_4=2.50$ | SF 18 | 1.721 | 29.281 |
|  | $R_8=+13.230$ | $s_4=1.60$ |  |  |  |
| 92 | $R_9=+48.130$ | $t_5=2.25$ | FK 5 | 1.487 | 70.041 |
|  | $R_{10}=-9.290$ | $s_5=0.25$ |  |  |  |
| 93 | $R_{11}=+50.850$ | $t_6=2.25$ | FK 5 | 1.487 | 70.041 |
|  | $R_{12}=-14.780$ | $s_6=3.11$ |  |  |  |
| 94 | $R_{13}=+7.182$ | $t_7=5.00$ | LaK 8 | 1.713 | 53.893 |
|  | $R_{14}=-4.039$ |  |  |  |  |
| 95 | $R_{14}=-4.039$ | $t_8=3.00$ | SF 18 | 1.721 | 29.281 |
|  | $R_{15}=+4.039$ |  |  |  |  |
| 38 | $R_{15}=+4.039$ | $t_9=3.63$ | LaK 8 | 1.713 | 53.893 |
|  | $R_{16}=-27.960$ |  |  |  |  |

Equivalent focal length of whole system (EFL)=2.5 mm.
Radius, thickness and spacing in millimeters.
In the above table the symbols designate the following:
FK 5—Fluoride Crown.
SF 4—Dense Flint.
SF 18—Dense Flint.
LaK 8—Lathanum Crown.

After the desired documents or other material have been photographed and the film developed, it may be placed within the film magazine 27 and threaded through the camera housing 25 for projection. The projection section of the present device, best shown in FIGURE 3 is provided with a high intensity bulb 97, mounted within a housing 98, which is secured to the base support member 20. Light from the projection bulb 97 is directed at a first mirror 99, as indicated by the dashed lines. The mirror 99 is a dichroic mirror of known construction which has the property of transmitting 99% of the incident infra-red light and reflecting visible light from the surface thereof. The mirror 99 is angularly disposed as shown in FIGURE 3 so that the light reflected from the surface is directed downwardly to a second dichroic mirror 100. The second dichroic mirror 100 transmits 99% of the reflected 1% of infra-red light coming from the first mirror 99, and reflects the visible light into the barrel 101 of the condenser lens system. A biconvex lens 102, located at the entrance end of the barrel 101 receives the light from the second mirror 100. An aspheric meniscus 103, is carried at the opposite end of the barrel 101, to transmit the light coming from the lens 102. Light leaving the aspheric lens 103 is directed at a prism face 104, carried at the bottom of the armature 36, from which it is reflected downwardly through a convex lens 105 at the bottom of the prism. A plano convex lens 106 completes the condenser lens assembly. The lens 106 is carried within the barrel 75 at the bottom of the armature 36.

Light leaving the condenser lens assembly will pass through the film 28 between the platen 37 and the last element 38 of the objective 39. It will be understood that at the time of projection the film will be firmly held between the platen and the last element of the objective by de-energizing the solenoid 35 in the manner hereafter more fully set forth.

Since it is important in projecting the image on the film to direct a light beam of high intensity through a film, and since the film area is quite small and subject to damage by excessive heat, it is essential that a cold beam of light be employed for this purpose. By reason of the two dichroic mirrors 99, 100, it will be seen that only one ten-thousandths of the initial infra-red light coming from the lamp 97 finds its way through the barrel 101. Accordingly, the film 28 in the projection station will not become damaged despite the fact that the light may be directed through it for long periods of time while the projected image is being examined.

In order to move the film for the purpose of examining successive areas, current is first applied to the solenoid 35. The armature 36 will move upwardly overcoming the thrust of the small coil spring 72. The coil spring 72 is disposed between the top of the solenoid armature 36, and the inner surface of the enlarged barrel 110 on the front of the condenser section. Coil spring 72 normally urges the armature 36 and the barrel 75 downwardly so as to close the space between the platen 37 and the last element 38 of the objective 39, through which the film 28 can be moved.

The film may be run through the projection section by means of the drive section 40, hereinabove described, or manually by rotating the knobs 112 as shown in FIGURES 3 and 4. The knobs 112 are secured directly to the reels 29, 30, and can be used for a rapid transfer of the film within the camera housing 25. The drive section 40 is disengaged for this operation by sliding sleeve 63 back on the shaft 60 and out of engagement with stub shaft 60a. Switch means (not shown) is also provided to hold the armature 36 up during rapid transfer. Individual indexing of the specific frames can be accomplished by means of the cam 53 and follower 54, together with the driving apparatus hereinabove described. Knob 111, shown in FIGURES 2 and 4, is a film tensioning device, and is attached to roller 31.

Referring to FIGURE 8, there is shown a wiring diagram for the projection operation of the present device. It will be noted that the wiring diagram of FIGURE 8 provides for the addition of a projection lamp 97. The high intensity illuminants 74 are omitted from this circuit as being unnecessary.

When the projecting apparatus is placed in operation as by closing the main switch 79, the projection lamp switch 112 is closed to light the lamp 97. When the push button starting switch 80 is closed, the solenoids 35, 71, will be energized, raising the armature 34 and releasing the brake 77. The motor 42 will rotate turning cam 46. The cam 46 will close switch 70 which will continue to energize the solenoid 35, causing it to hold the platen 37 above the film 28. The cam 46 will also hold the brake 77 open until near the end of one revolution of the motor output shaft 44. At the end of the cycle the cam 46 will open the switch 70, allowing the brake 77 to stop the motor. At the end of the revolution of the cam 46, the solenoid 35 will also be deenergized and the armature forced down into contact with the film 28 by operation of the coil spring 72. The film will thus be held against the last surface of the objective 39.

The light from the projection bulb 97 can then pass through the film 28 held between the platen 37 and the last element 38 of the objective 39 in the manner hereinabove set forth, whereupon an image of the picture on the film will be projected upon a table or sensitized surface (not shown) beneath the said objective.

From the foregoing it will be seen that there has been provided a combined camera and projection device capable of recording documents and other information upon minute areas of a sensitized film in a manner which will permit a large number of pictures to be stored in a minimum film space. In addition, the developed film can be projected by means of the projector portion of the device so that the minute photographs may be displayed for reading or photographic reproduction purposes in a size at least as large as the original document. Since high order of magnification and high resolution is involved in the present device, it is necessary that a suitable film such as one having a concentrated Lippmann emulsion and which is extremely transparent and of fine grain characteristics, be employed. In addition, it is most desirable to use photographic films having a very thin emulsion in the camera.

Having thus fully described the invention, what is claimed as new and desired to be secured by Letters Patent of the United States, is:

1. A projection device for photographic film containing a plurality of minute photographs comprising a base support, a film receiving housing slidably carried by the base support, an objective lens system carried by and traversing the base support, a last lens element in the objective, means to feed a photographic film through the housing and across the last lens element of the objective, means to hold the film in intimate contact with the surface of the last objective lens, a projection lamp housing secured to the base support, a lamp in the projection lamp housing, a first mirror to receive light from the lamp, a second mirror to receive light from the first mirror, said first and second mirror having the property of reflecting light in the visible range and transmitting infra-red light incident thereon, a condenser lens barrel to receive reflected visible light from the second mirror, a condenser lens system in the said barrel, means carried above the objective to direct the light traversing the condenser barrel through the film and the objective, and means to move the housing with respect to the objective lens to bring successive areas of the film into register with the objective lens.

2. A projection device for photographic film containing a plurality of minute photographs comprising a base support, a film receiving housing slidably carried by the base support, an objective lens system carried by and traversing the base support, a last lens element in the objective, means to feed a photographic film through the housing and across the last lens element of the objective, means to hold the film in intimate contact with the surface of the last objective lens, a projection lamp housing secured to the base support, a lamp in the projection lamp housing, a first dichroic mirror to receive light from the lamp, a second dichroic mirror to receive light from the first mirror, said first and second mirror having the property of reflecting light in the visible range and transmitting infra-red light incident thereon, a condenser lens barrel to receive reflected visible light from the second mirror, a condenser lens system in the said barrel, prism means carried above the objective to direct the light traversing the condenser barrel through the film and the objective, and means to move the housing with respect to the objective lens to bring successive areas of the film into register with the objective lens.

3. A projection device for photographic film containing a plurality of minute photographs comprising a base support, a film receiving housing slidably carried by the base support, an objective lens system carried by and traversing the base support, a last lens element in the objective, means to feed a photographic film through the housing and across the last lens element of the objective, means comprising a solenoid secured within the housing, an armature within the solenoid and a ring-like platten carried by the solenoid to hold the film in intimate contact with the surface of the last objective lens, a projection lamp housing secured to the base support, a lamp in the projection lamp housing, a first dichroic mirror to receive light from the lamp, a second dichroic mirror to receive light from the first mirror, said first and second mirror having the property of reflecting light in the visible range and transmitting infra-red light incident thereon, a condenser lens barrel to receive reflected visible light from the second mirror, a condenser lens system in the said barrel, prism means carried by the armature above the objective to direct the light traversing the condenser barrel through the film and the objective, and means to move the housing with respect to the objective lens to bring successive areas of the film into register with the objective lens.

4. A projection device according to claim 1 in which the film feed means comprises a source of rotary power, an output shaft driven by the power source, at least one sprocketted shaft coupled to the output shaft and driven thereby and switch means responsive to the rotation of the output shaft and connected to the power source to intermittently feed the film, and the housing moving means comprises a cam driven by the source of rotary power, a cam follower carried by the housing and means to urge the follower against the cam.

References Cited by the Examiner

UNITED STATES PATENTS

| | | | |
|---|---|---|---|
| 1,141,091 | 5/1915 | James et al. | 352—82 |
| 1,177,797 | 4/1916 | Oppenheimer | 352—82 |
| 1,340,539 | 5/1920 | Golden | 352—82 |
| 1,713,220 | 5/1929 | Eriksen et al. | 352—82 |
| 1,762,378 | 6/1930 | Avers | 352—82 |
| 1,856,583 | 5/1932 | Owens | 352—138 |
| 1,991,578 | 2/1935 | Rixen | 352—82 |
| 2,307,433 | 1/1943 | Vnkles | 88—24 |
| 2,322,489 | 6/1943 | Von Madaler | 352—6 |
| 2,334,547 | 11/1943 | Esper | 352—8 |
| 2,497,559 | 2/1950 | Rice | 95—37 |
| 2,552,184 | 5/1951 | Koch | 88—24 |
| 2,573,278 | 10/1951 | Rowe et al. | 95—37 |
| 2,787,942 | 4/1957 | Edwards | 95—37 |
| 2,791,153 | 5/1957 | Bedmarz | 88—57 |
| 2,943,535 | 7/1960 | Oxberry | 352—138 |
| 2,959,100 | 11/1960 | Lautenbacher | 88—57 |

NORTON ANSHER, *Primary Examiner.*